United States Patent
Örtenblad et al.

(10) Patent No.: US 11,290,897 B2
(45) Date of Patent: Mar. 29, 2022

(54) SIGNALING OPTIMIZATION IN 3GPP ANALYTICS

(71) Applicant: Telefonaktiebolaget LM Ericsson (publ), Stockholm (SE)

(72) Inventors: Helen Örtenblad, Gothenburg (SE); Ulf Mattsson, Kungsbacka (SE); Miguel Angel Puente Pestaña, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/055,107

(22) PCT Filed: May 15, 2018

(86) PCT No.: PCT/EP2018/062528
§ 371 (c)(1),
(2) Date: Nov. 12, 2020

(87) PCT Pub. No.: WO2019/219173
PCT Pub. Date: Nov. 21, 2019

(65) Prior Publication Data
US 2021/0250785 A1    Aug. 12, 2021

(51) Int. Cl.
*H04L 12/24* (2006.01)
*H04W 24/02* (2009.01)
(Continued)

(52) U.S. Cl.
CPC ......... *H04W 24/02* (2013.01); *H04L 41/0823* (2013.01); *H04L 41/14* (2013.01)

(58) Field of Classification Search
CPC .......................... H04L 41/0823; H04L 41/14
(Continued)

(56) References Cited

U.S. PATENT DOCUMENTS

2011/0131255 A1   6/2011   Kawamura
2015/0296531 A1   10/2015  Xue

FOREIGN PATENT DOCUMENTS

JP   2010067131 A   3/2010
JP   2011166626 A   8/2011
(Continued)

OTHER PUBLICATIONS

Technical Specification Group Services and System Aspects; Procedure for the 5G System; Stage 2 (Release 15), Technical Specification 23.502, Version 15.1.0, 3GPP Organizational Partners, Mar. 2018 (Year: 2018).*
(Continued)

*Primary Examiner* — Melvin C Marcelo
*Assistant Examiner* — Natali Pascual Peguero
(74) *Attorney, Agent, or Firm* — Withrow & Terranova, PLLC

(57) ABSTRACT

The invention relates to methods of providing requested network information from a first core Network Function (NF) to a second NF, and devices performing the methods. In an aspect, a method performed by a first core NF entity of providing requested network information to a second NF entity is provided. The method comprises receiving a request to obtain the network information originating from the second NF entity, determining an expiry time stipulating how long the requested network information is valid, and transmitting, towards the second NF entity, the requested network information and the expiry time.

22 Claims, 7 Drawing Sheets

(51) Int. Cl.
*H04L 41/0823* (2022.01)
*H04L 41/14* (2022.01)

(58) Field of Classification Search
USPC .................................................. 370/252, 254
See application file for complete search history.

(56) References Cited

FOREIGN PATENT DOCUMENTS

| RU | 2387103 C2 | 4/2010 |
|---|---|---|
| RU | 2646317 C1 | 3/2018 |
| RU | 2646336 C1 | 3/2018 |
| WO | 2009004694 A1 | 1/2009 |
| WO | 2017215756 A1 | 12/2017 |
| WO | 2018072824 A1 | 4/2018 |

OTHER PUBLICATIONS

CATT, "S2-183685: Solution for optimizing connection management based on NWDAF output," Third Generation Partnership Project (3GPP), SA WG2 Meeting #127, Apr. 16-20, 2018 (Year: 2018).*

Official Action for Russian Patent Application No. 2020141040, dated Apr. 5, 2021, 11 pages.

Author Unknown, "Technical Specification Group Services and System Aspects; Study of Enablers for Network Automation for 5G; (Release 16)," Technical Report 23.791, Version 0.3.0, 3GPP Organizational Partners, Apr. 2018, 19 pages.

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.

Author Unknown, "Technical Specification Group Services and System Aspects; Procedures for the 5G System Stage 2 (Release 15)," Technical Specification 23.502, Version 15.1.0, 3GPP Organizational Partners, Mar. 2018, 285 pages.

CATT, "S2-183685: Solution for optimizing connection management based on NWDAF output," Third Generation Partnership Project (3GPP), SA WG2 Meeting #127, Apr. 16-20, 2018, 3 pages, Sanya, China.

International Search Report and Written Opinion for International Patent Application No. PCT/EP2018/062528, dated Jan. 18, 2019, 11 pages.

International Preliminary Report on Patentability for International Patent Application No. PCT/EP2018/062528, dated Apr. 9, 2020, 17 pages.

Notice of Reasons for Refusal and Search Report for Japanese Patent Application No. 2020-558948, dated Jan. 6, 2022, 41 pages.

* cited by examiner

SIGNALING OPTIMIZATION IN 3GPP ANALYTICS

This application is a 35 U.S.C. § 371 national phase filing of International Application No. PCT/EP2018/062528, filed May 15, 2018, the disclosure of which is incorporated herein by reference in its entirety.

TECHNICAL FIELD

The invention relates to methods of providing requested network information from a first core Network Function (NF) to a second NF, and devices performing the methods.

BACKGROUND

The fifth generation (5G) System architecture being standardized by 3rd Generation Partnership Project (3GPP) is defined to support data connectivity and services enabling deployments to use techniques such as e.g. Network Function Virtualization (NFV) and Software Defined Networking (SDN).

FIG. 1 illustrates a 5G core network comprising a plurality of so called Network Functions (NFs) or core network function entities, such as a Unified Data Repository (UDR, 10) for storing subscription data and policy data, a Network Exposure Function (NEF, 11) for exposing capabilities and events, and an Access and Mobility Management Function (AMF, 12) configured to manage registration, connection, reachability, mobility, etc.

Further, the 5G core network comprises a Network Data Analytics Function (NWDAF, 13) which represents an operator managed network analytics logical function. The NWDAF is discussed for instance in 3GPP specification TS 23.502. The NWDAF is an example of a network function entity that provides network information such as slice specific network data analytics to other network function entities such as Policy Control Function (PCF, 14) and Network Slice Selection Function (NSSF, 15). The NWDAF 13 provides network analytics information (i.e., load level information) to the PCF 14 and the NSSF 15 on a network slice instance level and the NWDAF 13 is not required to be aware of the current subscribers using the slice. The NWDAF 13 notifies/publishes slice specific network status analytic information to the PCF(s) and NSSF that are subscribed to it. The PCF(s) and NSSF may collect directly slice specific network status analytic information from NWDAF. This information is not subscriber specific. The PCF 14 uses that data in its policy decisions. The NSSF 15 may use the load level information provided by the NWDAF 13 for slice selection, i.e. which slices are to serve a User Equipment (UE) such as for instance a mobile phone.

Moreover, an Application Function (AF, 16) supports application influence on traffic routing, a Session Management function (SMF, 17) is configured to perform session management, e.g. session establishment, modify and release, etc., and a User Plane Function (UPF, 18) is a service function that processes user plane packets; processing may include altering the packet's payload and/or header, interconnection to data network(s), packet routing and forwarding, etc. It is noted that further NFs than those illustrated in FIG. 1 may be included in the 5G core network.

In the core network, an NF may subscribe to the NWDAF to periodically receive network analytics information, or to request and receive the information instantly A problem of the current solution is the potentially unnecessary signaling load created in the core network. Some network analytics information may not change significantly over time, and may even be static. Hence, the same information (or a very similar one) would be provided repeatedly, entailing redundant signaling in the network.

SUMMARY

An object of the invention is to solve, or at least mitigate, this problem and thus to provide a method in a core network of providing requested network analytics information from an NWDAF to an NF.

This object is attained in a first aspect of the invention by a method performed by a first core NF entity of providing requested network information to a second NF entity. The method comprises receiving a request to obtain the network information originating from the second NF entity, determining an expiry time stipulating how long the requested network information is valid, and transmitting, towards the second NF entity, the requested network information and the expiry time.

This object is attained in a second aspect of the invention by a first core NF entity configured to provide requested network information to a second NF entity, the first core NF entity comprising a processing unit and a memory, said memory containing instructions executable by said processing unit, whereby the first core NF entity is operative to receive a request to obtain the network information originating from the second NF entity, determine an expiry time stipulating how long the requested network information is valid, and to transmit, towards the second NF entity, the requested network information and the expiry time.

This object is attained in a third aspect of the invention by a method performed by a requesting NF entity of obtaining network information of a responding core NF entity. The method comprises transmitting, towards the responding core NF entity, a request to obtain the network information, and receiving the requested network information and an expiry time determined by the responding core NF entity stipulating how long the requested network information is valid.

This object is attained in a fourth aspect of the invention by a requesting NF entity configured to obtaining network information of a responding core NF entity, the requesting NF entity comprising a processing unit and a memory, said memory containing instructions executable by said processing unit, whereby the requesting NF entity is operative to transmit towards the responding core NF entity, a request to obtain the network information, and to receive the requested network information and an expiry time determined by the responding core NF entity stipulating how long the requested network information is valid.

This object is attained in a fifth aspect of the invention by a method performed by a proxy device of providing requested network information of a first core NF entity, to a second NF entity. The method comprises receiving, from the second NF entity, a request to obtain the network information, transmitting, to the first core NF entity, the request to obtain the network information, receiving, from the first core NF entity, the requested network information and an expiry time determined by the first core NF entity stipulating how long the requested network information is valid, and transmitting, to the second NF entity, the requested network information.

This object is attained in a sixth aspect of the invention by a proxy device configured to provide requested network information of a first core NF entity, to a second NF entity, the proxy device comprising a processing unit and a memory, said memory containing instructions executable by said processing unit, whereby the proxy device is operative to receive, from the second NF entity, a request to obtain the network information, transmit, to the first core NF entity, the request to obtain the network information, receive, from the first core NF entity, the requested network information and an expiry time determined by the first core NF entity stipulating how long the requested network information is valid, and to transmit, to the second NF entity, the requested network information.

In an aspect, a requesting NF entity sends a request to obtain network information, also referred to as network analytics information, to a responding core NF entity. As an example, the requesting NF entity requests an indication of traffic load during a particular day of the week for one or more network slices instances handled by the responding core NF entity. Hence, the request comprises an indicator specifying the particular network information.

Upon receiving the request from the requesting NF entity, the responding core NF entity acquires the requested network information (e.g. from a local storage) and associates an expiry time with the requested network information indicating how long the requested network information is valid.

Thereafter, the responding core NF entity sends the requested network information and the associated expiry time to the requesting NF entity. Advantageously, with the expiry time associated with the requested network information, the requesting NF entity may come to a number of conclusions. For instance, the requesting NF entity may (1) conclude that it is not necessary to request the information again until the expiry time has expired in the case of a request/response operation, or (2) update a periodicity with which it expects to receive the requested network analytics information in the case of a subscribe/notify operation. In (1), the invention enables reducing unnecessary signalling between the responding core NF entity and the NF(s) requesting the network analytics information. In (2), if the expiry time is longer than the periodicity with which the NF(s) wish to subscribe to the requested information, unnecessary signalling is avoided, while if the expiry time is shorter than the periodicity with which the NF(s) wish to subscribe to the requested information, up-to-date information will be received at the NF(s).

In an embodiment, the request sent from the requesting NF entity further comprises at least one of: at least one identifier identifying a network slice instance for which the request is made, and at least one identifier identifying a user device or a group of user devices for which the request is made.

In another embodiment, the request sent from the requesting NF entity further comprises an indication of periodicity with which the request network information is to be obtained, wherein the responding core NF entity transmits the requested network information with a periodicity stipulated by the determined expiry time.

In a further embodiment, the responding core NF entity sends a message towards the requesting NF entity comprising a recommended periodicity stipulated by the determined expiry time, wherein the requesting NF entity sends a confirmation indicating whether the recommended periodicity stipulated by the determined expiry time should be used or not.

In another embodiment, the responding core NF entity sends an update message towards the second NF entity, in case it is determined that the expiry time for the requested network information has changed, the update message comprising a recommended periodicity stipulated by the determined changed expiry time; wherein the requesting NF entity sends a confirmation indicating whether the recommended periodicity stipulated by the determined changed expiry time should be used or not.

In yet an embodiment, the request originating from the requesting NF entity to obtain the network information is received the responding core NF entity via a proxy device to which the requested network information and the expiry time is transmitted for forwarding to the second NF entity (14, 15).

In an embodiment, the requesting NF entity will refrain from making another request for said network information as long as the expiry time has not elapsed.

In yet an embodiment, the requesting NF entity stores the received network information and the expiry time.

In a further aspect, a requesting NF entity sends a request to obtain network information, via a proxy device forwarding the request, to a responding core NF entity.

In response thereto, the responding core NF entity determines the expiry time for the requested network information and sends a response message to the proxy device comprising the requested network information and the expiry time. The proxy device then stores the received information and forwards the requested network information to the requesting NF entity.

Now, assuming that a further NF entity wishes to obtain the same network information as was just delivered to the requesting and the proxy device; the further NF entity will then send a request to the proxy device which will deliver the requested network information, given that the expiry time has not elapsed.

In a seventh aspect of the invention, a computer program is provided comprising computer-executable instructions for causing a first core NF entity to perform steps recited in the method of the first aspect when the computer-executable instructions are executed on a processing unit included in the first core NF entity.

In an eight aspect of the invention, a computer program product is provided comprising a computer readable medium, the computer readable medium having the computer program of the seventh aspect embodied thereon.

In a ninth aspect of the invention, a computer program is provided comprising computer-executable instructions for causing a requesting NF entity to perform steps recited in the method of the third aspect when the computer-executable instructions are executed on a processing unit included in the requesting NF entity.

In a tenth aspect of the invention, a computer program product is provided comprising a computer readable medium, the computer readable medium having the computer program of the ninth aspect embodied thereon.

In an eleventh aspect of the invention, a computer program is provided comprising computer-executable instructions for causing a proxy device to perform steps recited in the method of the fifth aspect when the computer-executable instructions are executed on a processing unit included in the proxy device.

In a twelfth aspect of the invention, a computer program product is provided comprising a computer readable medium, the computer readable medium having the computer program of the eleventh aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
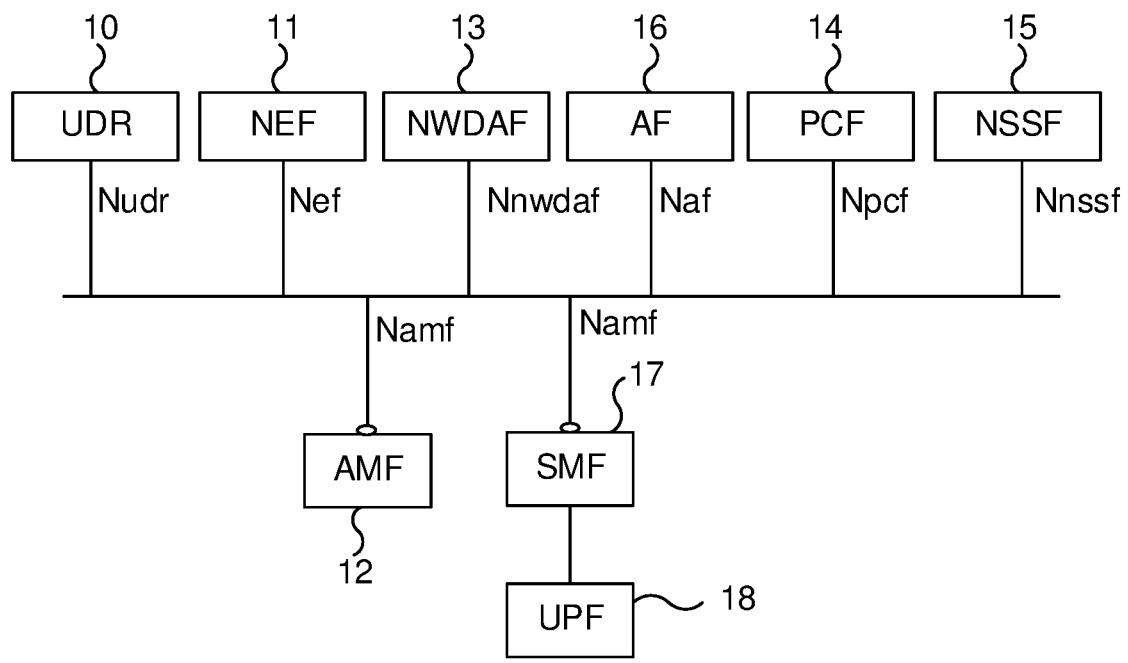
FIG. 1 illustrates a 5G core network in which the invention may be implemented.

FIG. 1 illustrates a 5G core network and the NFs included have been discussed previously.

Now, the NWDAF 13 is responsible for providing network analytics information upon request or subscription from NFs. For example, an NF may request specific analytics information on the load level of a particular network slice.

In an example, the load level information provided by the NWDAF 13 may indicate that traffic load of a particular slice is relatively high at a particular time window of a certain day of the week, such as e.g. between 09:00 and 10:00 on a Monday, in which case the NF receiving the load level information, for instance the PCF 14 or the NSSF 15, may select another network slice for UE(s) served by the PCF/NSSF.

The PCF 14 or NSSF 15 may either subscribe to receive the load level information on a periodical basis or if a particular load level threshold is exceeded, or actively submit a request to instantly receive the load level information.

Hence, as defined in 3GPP specifications, the NWDAF 13 (the service provider) provides analytics insights (e.g. load level information) either by means of a subscribe/notify operation or a request/response operation (to the service consumer).

Further examples as to what information could constitute network analytics information are one or more of: (a) application usage and capacity patterns at certain location or at certain time interval/type of day or combination thereof, and (b) most used routes (by measure users movements) to e.g. predict upcoming load.

Further examples are user specific information such as: (c) most used application for a specific user at specific location and/or time, (d) a specific user's routes (location and time), to predict next location for the user to e.g. improved paging, (e) specific user's data usage for preventive downloads, and (f) a specific user's most visited locations for identifying his/hers most suited registration areas.

In the subscribe/notify case, the NWDAF 13 provides insights to the subscribed consumer:
(a) periodically (period value provided by the consumer in the subscription request), or
(b) when the insight value changes exceed a certain threshold value (the threshold value is provided by the consumer as well).

In the request/response case, the NWDAF 13 provides the insight:
(c) each time it receives a request from any of the authenticated consumers.

The main problem of the current solution is the potentially unnecessary signaling load created in options (a) and (c). Some insights may not change significantly over time, and may even be static. In this case the same insight value (or a very similar one) would be provided repeatedly, entailing redundant signaling in the network.

Figure 2:
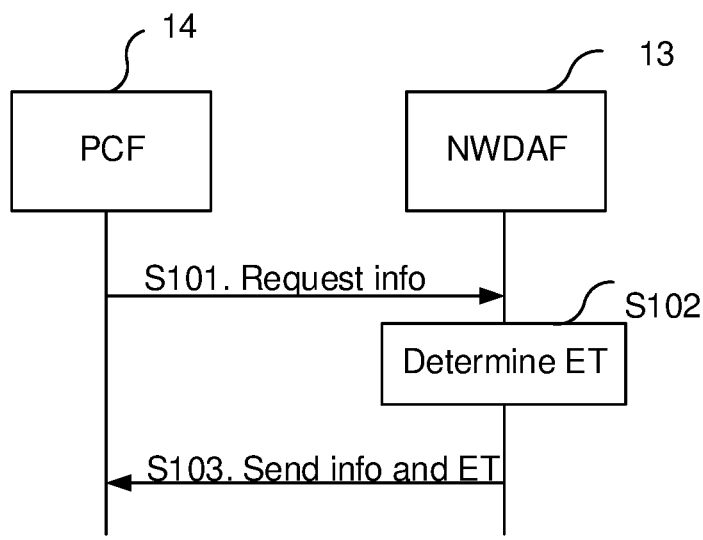
FIG. 2 shows a signalling diagram illustrating a method performed by a first, responding core NF entity of providing network analytics information to a second NF entity requesting the network analytics information according to an embodiment.

FIG. 2 shows a signalling diagram illustrating a method performed by a first, responding core NF entity, exemplified throughout the description in the form of the NWDAF 13, of providing network analytics information to a second NF entity requesting the network analytics information according to an embodiment, in this case exemplified throughout the description by the PCF 14 for policy decisions. It is noted that the second, requesting NF entity not necessarily is located in the core network, but could alternatively be embodied by a non-core network entity such as an AF 16.

In a first step 101, the PCF 14 sends a request to obtain network analytics information to the NWDAF 13. As an example, the PCF 14 requests an indication of traffic load during a particular day of the week for one or more network slices instances handled by the NWDAF 13. Hence, the request comprises an Analytic ID specifying the particular network analytics information requested and optionally in an embodiment a Slice instance ID identifying one or more slice instances for which the request is made.

Upon receiving the request from the PCF 14, the NWDAF 13 acquires the requested network analytics information (e.g. from a local storage) and associates an expiry time with the requested network analytics information in step S102 indicating how long the requested network analytics information is valid. The expiry time will throughout the drawings be denoted "ET".

Thereafter, in step S103, the NWDAF 13 sends the requested network analytics information and the associated expiry time to the PCF 14.

Advantageously, with the expiry time associated with the requested network analytics information, the PCF 14 may come to a number of conclusions. For instance, the PCF 14 may (1) conclude that it is not necessary to request the information again until the expiry time has expired in the case of a request/response operation, or (2) update the periodicity with which it expects to receive the requested network analytics information in the case of a subscribe/notify operation. In (1), the invention enables reducing unnecessary signalling between the NWDAF 13 and the NF(s) requesting the network analytics information. In (2), if the expiry time is longer than the periodicity with which the NF(s) wish to subscribe to the requested information, unnecessary signalling is avoided, while if the expiry time is shorter than the periodicity with which the NF(s) wish to subscribe to the requested information, up-to-date information will be received at the NF(s).

In an embodiment, the request transmitted from the PCF 14 in step S101 further comprises a User ID or a User Group ID indicating a single user device or a group of user devices for which the request for network analytics information is made. Advantageously, this provides for handling the NWDAF analytics information per user or user group. To that extent, an NF can retrieve analytics information for a specific user device or group of user devices.

Figure 3:
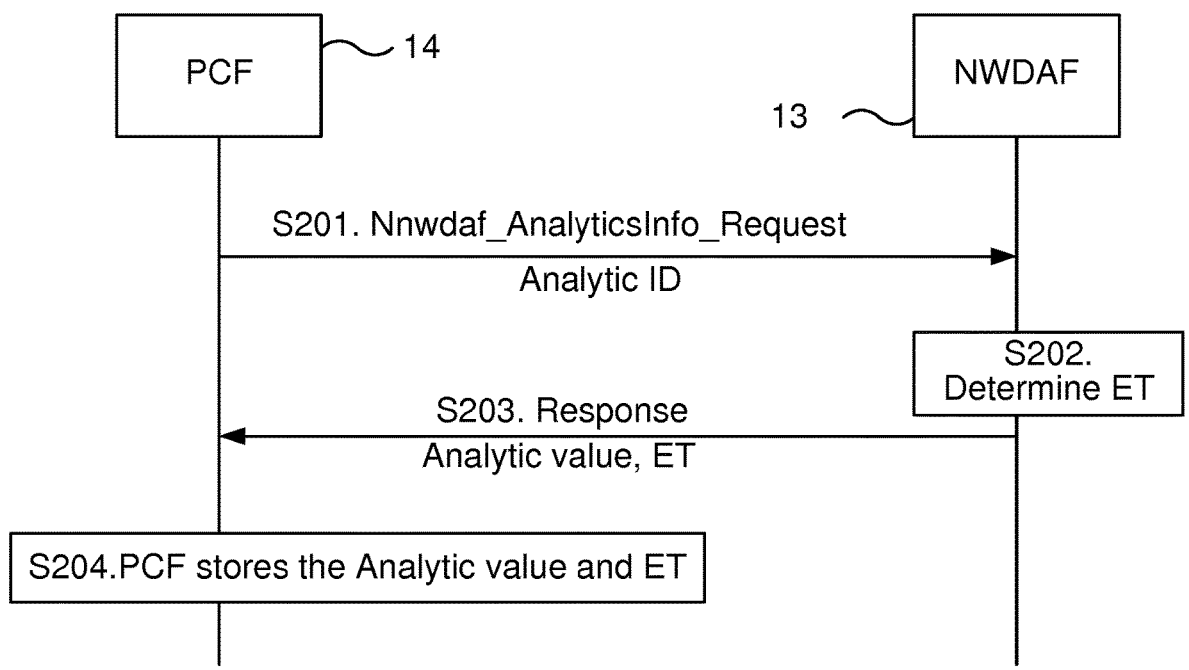
FIG. 3 shows a signalling diagram illustrating a method performed by a first, responding core NF entity of providing network analytics information to a second NF entity requesting the network analytics information according to another embodiment.

FIG. 3 shows a signalling diagram illustrating a method performed by an NWDAF 13 in a core network of providing requested network analytics information to the PCF 14 according to an embodiment.

FIG. 3 illustrates a scenario where the PCF 14 performs a request/response operation.

In a first step S201, the PCF 14 sends a request to obtain network analytics information to the NWDAF 13 in the form of an Nnwdaf_AnalyticsInfo_Request message to the NWDAF 13 including Analytic ID identifying the requested network analytics information, and optionally Slice instance ID and/or User/User group ID.

In response thereto, the NWDAF 13 determines in step S202 the expiry time for the requested network analytics information and sends in step S203 a response message to the PCF 14 including Analytic value and Expiry Time, where "Analytic value" denotes the actually requested payload network analytics information.

Upon receiving the response message in step S203, the PCF 14 stores the network analytics information and the expiry time associated with the information in step S204, and optionally any Slice instance ID and/or User/User group ID. Even though not shown in FIG. 3, it is noted that the PCF 14 may send an acknowledgement to the NWDAF 13 that the information has been received either before or after storing the information in step S204.

Now, in an embodiment, as longs as the time that has elapsed since the receiving of the requested network analytics information does not exceed the stored expiry time, the PCF 14 will turn to stored network analytics information for every user it serves as identified by means of the User/User group ID. It is noted that the NWDAF 13 already may be aware of the particular device/group of devices identified by means of the User/User group ID, it may not be necessary to send the User/User group ID. Further, if the PCF 14 already is aware of which device(s) the received network information relates to, it may not be necessary to send the User/User group ID When the time that has elapsed since the receiving of the requested network analytics information indeed exceeds the stored expiry time, the PCF 14 may repeat the procedure of requesting the network analytics information of step S201) in which case the NWDAF 13 again will determine the expiry time in step S202 and send the requested network analytics information along with the expiry time to the PCF 14. It is noted that the expiry time as well as the network analytics information with which it is associated may have changed.

Figure 4:
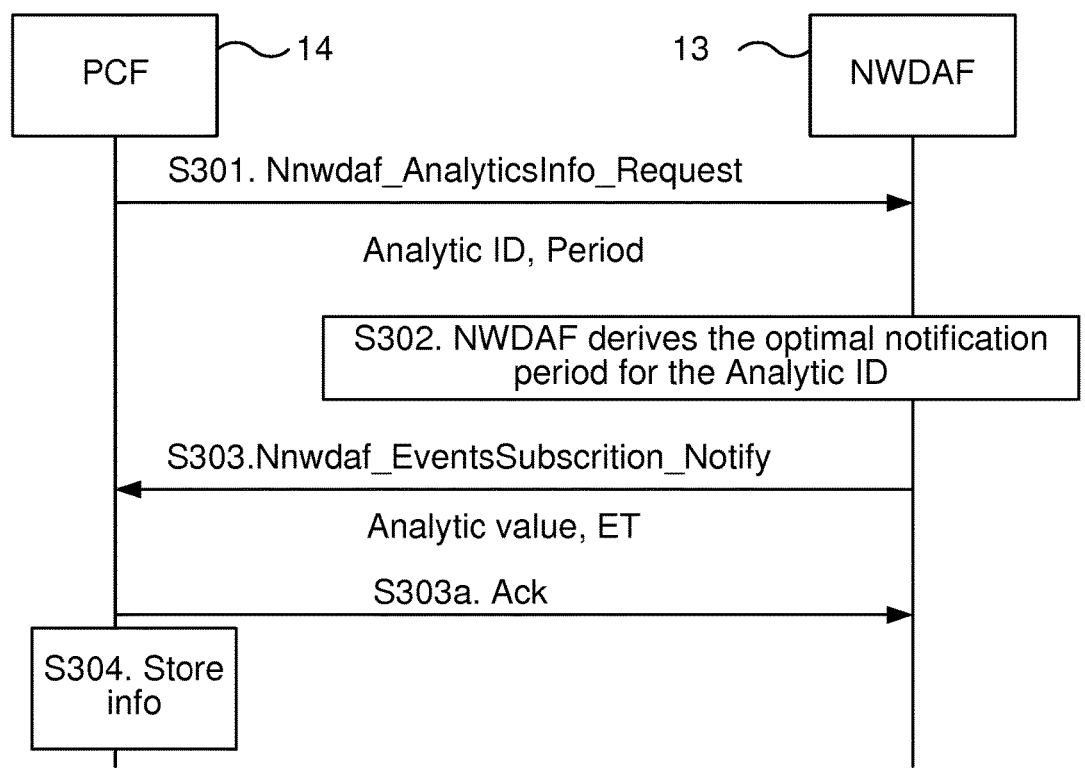
FIG. 4 shows a signalling diagram illustrating a method performed by a first, responding core NF entity of providing network analytics information to a second NF entity requesting the network analytics information according to yet another embodiment.

FIG. 4 shows a signalling diagram illustrating a method performed by an NWDAF 13 in a core network of providing requested network analytics information to the PCF 14 according to an embodiment.

FIG. 4 illustrates a scenario where the PCF 14 performs a subscribe/notify operation.

In a first step S301, the PCF 14 sends a request to obtain network analytics information to the NWDAF 13 in the form of an Nnwdaf_EventsSubscription_Subscribe message to the NWDAF 13 including Analytic ID identifying the requested network analytics information, and optionally Slice instance ID and/or User/User group ID, as well as an indication ("Period") with which periodicity the PCF 14 wishes to receive the requested network analytics information.

Upon receiving the request, the NWDAF 13 determines in step S302 the expiry time for the requested network analytics information in order to set an optimal notification period for the network analytics information (identified by means of the Analytic ID).

In a first example, assuming that the PCF 14 indicates with parameter Period that it wishes to receive the requested network analytics information every 1 minute—i.e. Period=1 minute—while the NWDAF 13 concludes that the requested network analytics information is valid for 2 minutes; the NWDAF 13 will thus determine that the optimal notification period is 2 minutes. As a consequence, the NWDAF 13 will send the requested network analytics information every 2 minutes instead of every 1 minute, as the requested network analytics information is not likely to have changed until the expiry time has elapsed. Advantageously, unnecessary signalling is avoided.

In a second example, assuming that the PCF 14 indicates with parameter Period that it wishes to receive the requested network analytics information every 2 minutes—i.e. Period=2 minutes—while the NWDAF 13 concludes that the requested network analytics information is valid for 1 minute; the NWDAF 13 will thus determine that the optimal notification period is 1 minute. As a consequence, the NWDAF 13 will send the requested network analytics information every 1 minute instead of every 2 minutes, as the requested network analytics information is likely to have changed after the expiry time has elapsed. Advantageously, the PCF 14 is provided with up-to-date network analytics information. An ACK message may be sent from the PCF 14 to the NWDAF indicating that the PCF 14 accepts the proposed shorter period. Alternatively, a NACK message may be sent from the PCF 14 to the NWDAF indicating that the PCF 14 does not accept the proposed shorter period.

In step S303, the NWDAF 13 sends the periodically requested network analytics information in the form of an Nnwdaf_EventsSubscription_Notify message to the PCF 14 including: Slice instance ID, Analytic ID, Analytic value, Expiry Time, where the "Analytic value" denotes the actually requested payload information.

Hence, the NWDAF 13 will send the requested network analytics information to the PCF 14 with a periodicity stipulated by the determined expiry time associated with the requested network analytics information. That is, in case of the first example hereinabove, the NWDAF 13 will send the requested network analytics information to the PCF 14 every 2 minutes instead of with a periodicity of 1 minute as originally requested by the PCF 14. As is understood, this may imply that the NWDAF 13 will wait—after having determined the expiry time in step S202—until the current 1-minute period has elapsed, if the time up until a next update of the analytics information is shorter then the periodicity of the notifications.

Upon receiving the notification message in step S303, the PCF 14 may send an acknowledgement message Ack to the NWDAF 13 in step S303a. This may be particularly preferable in a scenario where the received expiry time stipulating the periodicity differs from a requested (or previously stored) period, i.e. when any changes in periodicity occur.

Further, the PCF 14 stores in step S304 the network analytics information and the expiry time associated with the information and optionally any Slice instance ID and/or User/User group ID.

Figure 5:
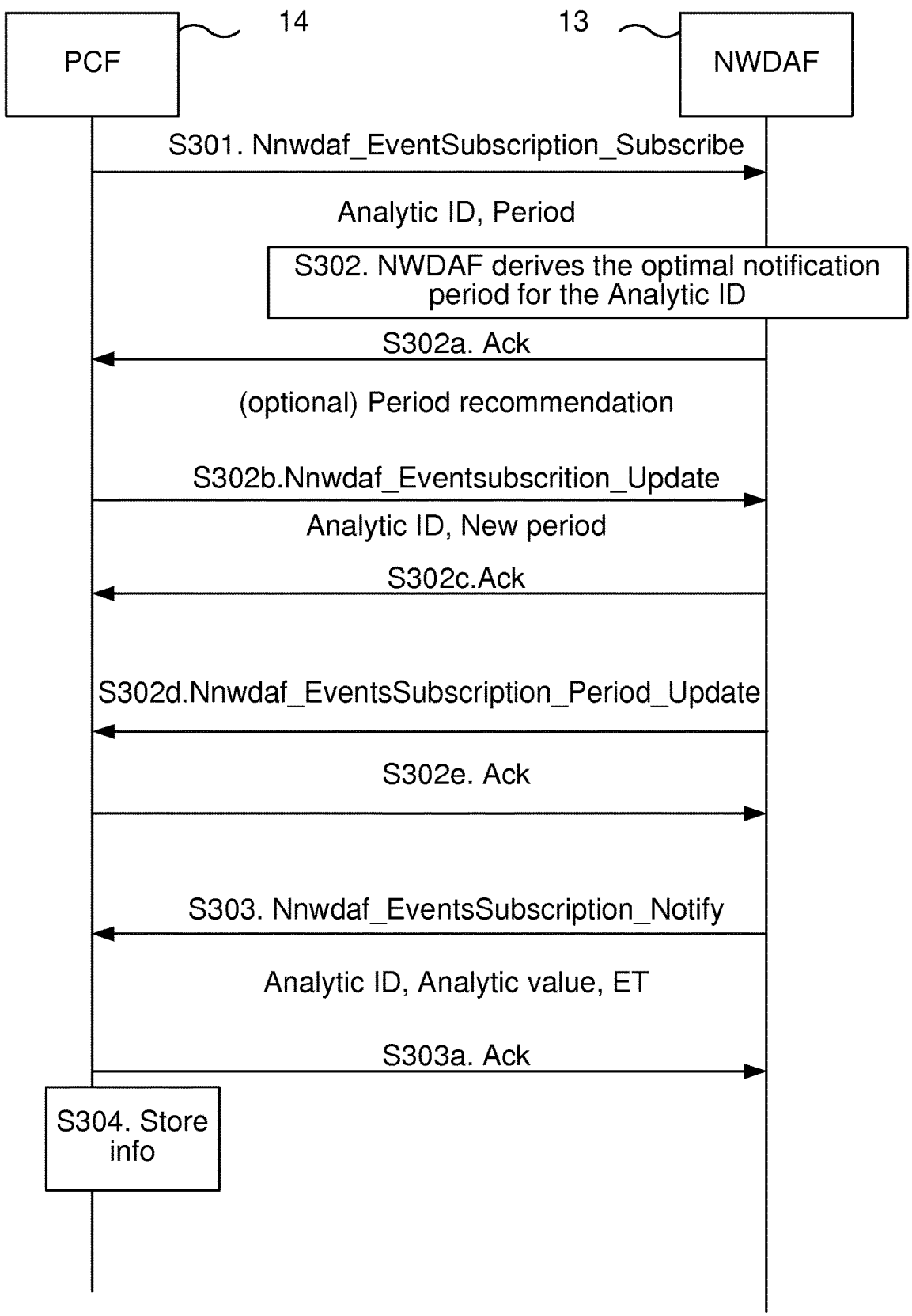
FIG. 5 shows a signalling diagram illustrating a method performed by a first, responding core NF entity of providing network analytics information to a second NF entity requesting the network analytics information according to a further embodiment.

FIG. 5 shows a signalling diagram illustrating a method performed by an NWDAF 13 in a core network of providing requested network analytics information to the PCF 14 according to a further embodiment.

FIG. 5 illustrates a scenario where the PCF 14 performs a subscribe/notify operation.

As in the embodiment described with reference to FIG. 4, in a first step S301, the PCF 14 sends a request to obtain network analytics information to the NWDAF 13 in the form of an Nnwdaf_EventsSubscription_Subscribe message to the NWDAF 13 including Analytic ID identifying the requested network analytics information, and optionally Slice instance ID and/or User/User group ID, as well as an indication ("Period") with which periodicity the PCF 14 wishes to receive the requested network analytics information.

Upon receiving the request, the NWDAF 13 determines in step S302 the expiry time for the requested network analytics information in order to set an optimal notification period for the network analytics information.

Again, an example is assumed where the PCF 14 indicates with parameter Period that it wishes to receive the requested network analytics information every 1 minute while the NWDAF 13 concludes that the requested network analytics information is valid for 2 minutes; the NWDAF 13 will thus determine that the optimal notification period is 2 minutes. As a consequence, the NWDAF 13 will propose to send the requested network analytics information every 2 minutes instead of every 1 minute, as the requested network analytics information is not likely to have changed until the expiry time has elapsed. Advantageously, unnecessary signalling is avoided.

Optionally, the NWDAF 13 may acknowledge (Ack) the request in step S302a, and may further optionally include a Period recommendation along with the Ack. In line with the above example, Period recommendation=2 minutes. Advantageously, this will give the PCF 14 a possibility to reject the recommendation.

If the Period recommendation is included in the Ack, the PCF 14 may send an update request, i.e. an Nnwdaf_EventsSubscription_Update message, in step S302b to the NWDAF 13 to update the notification periodicity, the request in this particular embodiment including: Slice instance ID, Analytic ID, User/User group ID, New Period (i.e. New Period=2 minutes), which update request the NWDAF 13 may acknowledge in step S302c.

Further, the NWDAF 13 may send an Nnwdaf_EventsSubscription_Period_Update message to the PCF 14 in step S302d including Slice instance ID, Analytic ID, User/User group ID, New Period, which period update the PCF 14 may acknowledge in step S302e. If acknowledged, the period is updated to the new period (being 2 minutes). If not acknowledged, the previous period of 1 minute is maintained.

As previously described, the NWDAF 13 may wait until the current 1-minute period has elapsed and thereafter sends the periodically requested network analytics information in the form of an Nnwdaf_EventsSubscription_Notify message to the PCF 14 including: Slice instance ID, Analytic ID, Analytic value, Expire Time, where the "Analytic value" denotes the actually requested payload information in step S303.

Upon receiving the notification message in step S303, the PCF 14 may send an acknowledgement message Ack to the NWDAF 13 in step S303a.

Further, the PCF 14 stores in step S304 the network analytics information and the expiry time associated with the information, and optionally any Slice instance ID and/or User/User group ID.

Figure 6:
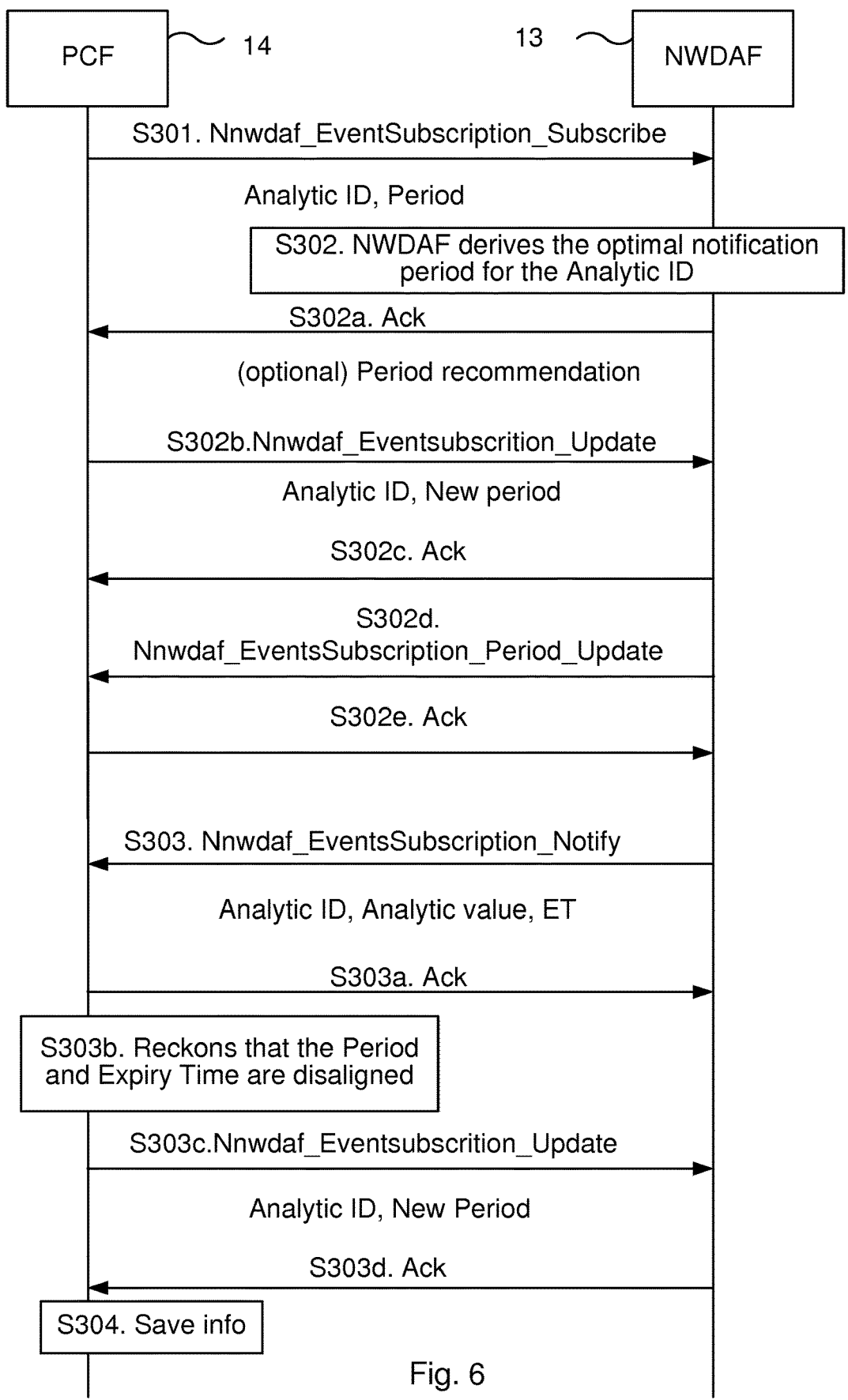
FIG. 6 shows a signalling diagram illustrating a method performed by a first, responding core NF entity of providing network analytics information to a second NF entity requesting the network analytics information according to still a further embodiment.

FIG. 6 shows a signalling diagram illustrating a method performed by an NWDAF 13 in a core network of providing requested network analytics information to the PCF 14 according to still a further embodiment.

FIG. 6 illustrates a scenario where the PCF 14 performs a subscribe/notify operation but where the process differs somewhat from that described with reference to FIG. 5. Nevertheless, up until step S303a, the embodiments are the same, and steps S301-S303a will not be described again.

In this embodiment, the received network analytics information is not stored following the acknowledgement in step S303a (but will be stored later), since the PCF 14 detects in step S303b that the received expiry time associated with the network analytics information received in step S303 differs from the new period that has been agreed upon through steps S302b-S302e as a result of the NWDAF 13 determining—after having performed step S302c (or after step S302e)—that the expiry time should have a new value.

The PCF 14 thus sends an Nnwdaf_EventsSubscription_Update message to the NWDAF 13 in step S303c in order to perform a handshake procedure as regards the changed expiry time as detected by the PCF 14 in step s303b, the message including: Slice instance ID, Analytic ID, User/User group ID, New Period (based on the changed expiry time).

The NWDAF 13 acknowledges the request in step S303d, and the PCF can finally store the network analytics information and the new expiry time associated with the information, and optionally any Analytic ID, Slice instance ID and/or User/User group ID in step S304.

Figure 7:
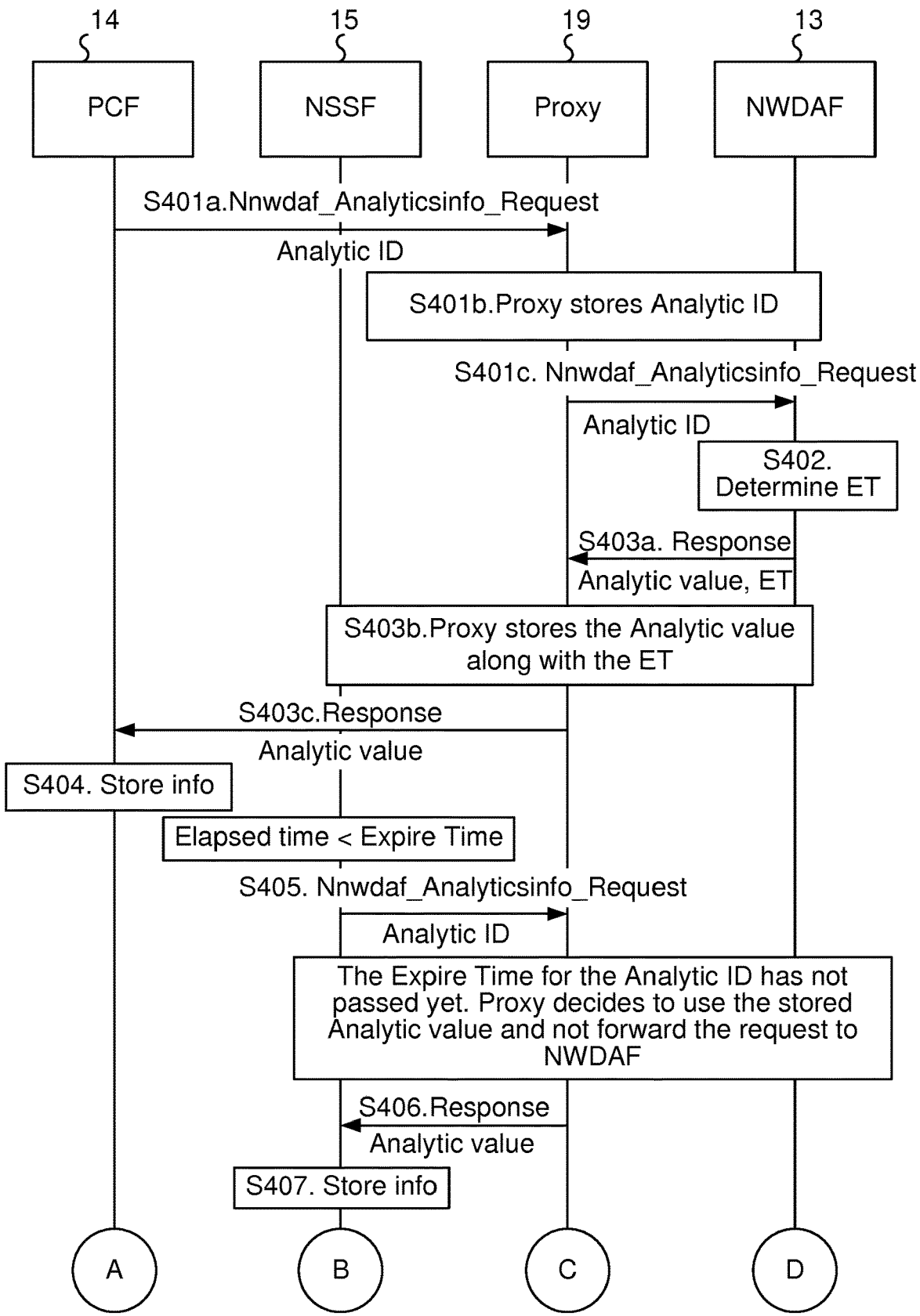
FIG. 7 shows a signalling diagram illustrating a method performed by a first, responding core NF entity of providing, via a proxy device, network analytics information to a second NF entity requesting the network analytics information according to an embodiment.
Figure 7:
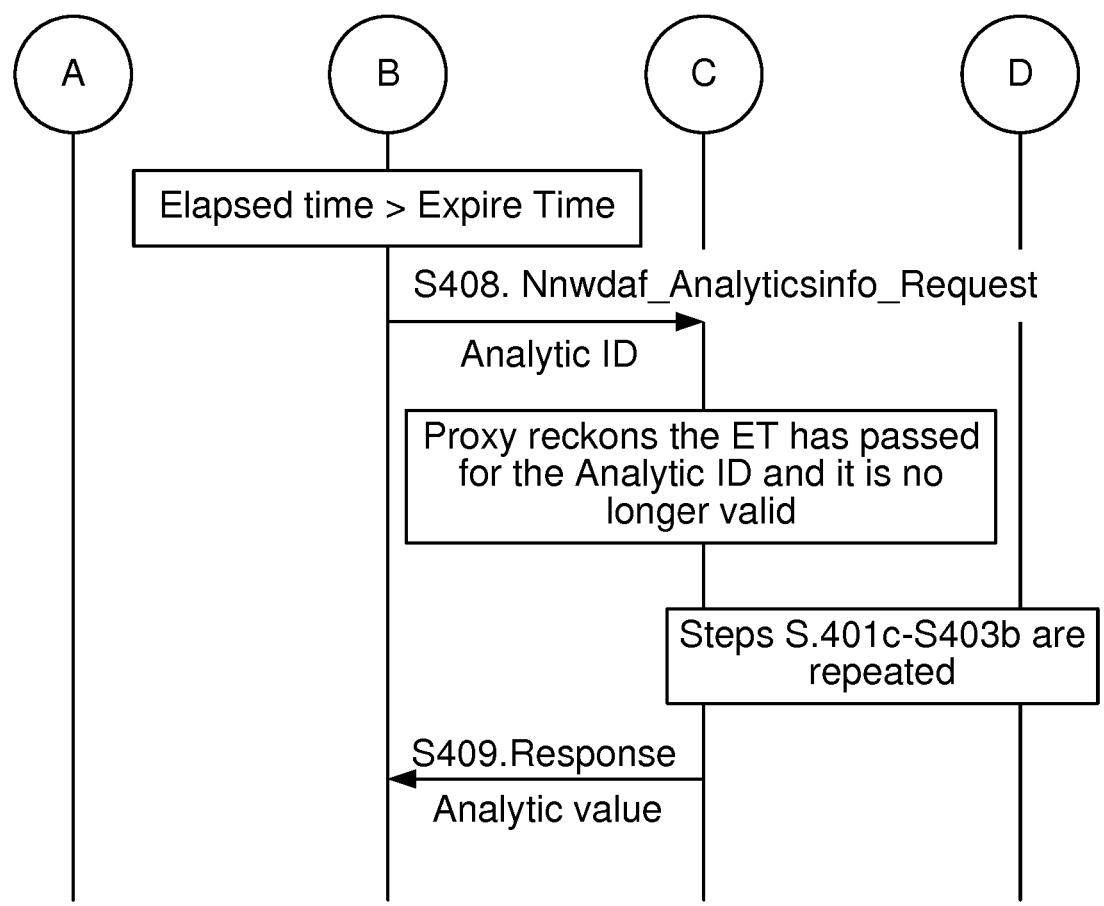

FIG. 7 shows a signalling diagram illustrating a method performed by an NWDAF 13 in a core network of providing, via a proxy 19, requested network analytics information to the PCF 14 according to another embodiment. It is noted that the proxy 19 may be located inside the NWDAF 13 of even inside the PCF 14.

FIG. 7 illustrates a scenario where the PCF 14 performs a request/response operation via the proxy 19.

In a first step S401a, the PCF 14 sends a request to obtain network analytics information to the NWDAF 13 in the form of an Nnwdaf_AnalyticsInfo_Request message including Analytic ID identifying the requested network analytics information, and optionally Slice instance ID and/or User/User group ID.

However, in this embodiment the request is sent to the proxy 19 which stores the Analytic ID, the Slice instance ID and the User/User group ID in step S401b and forwards the request Nnwdaf_AnalyticsInfo_Request to the NWDAF 13 in step S401c.

In response thereto, the NWDAF 13 determines in step S402 the expiry time for the requested network analytics information and sends in step S403a a response message to the PCF 14 including Analytic value and Expiry Time, where "Analytic value" denotes the actually requested payload network analytics information.

Again, this is passed via the proxy 19 which stores the requested network analytics information and the expiry time in step S403b, and maps it to the previously stored Analytic ID, the Slice instance ID and the User/User group ID, before forwarding the requested network analytics information to the PCF 14 in step S403c, which stores it in step S404.

Now, assuming that another, third NF, for instance the NSSF 15, wishes to obtain the same network analytics information as was just delivered to the PCF 14 and the proxy 19; the NSSF 15 will then send a request to the proxy 19 in the form of an Nnwdaf_AnalyticsInfo_Request message to the proxy in step S405 comprising the Analytic ID, the Slice instance ID and the User/User group ID.

If the expiry time has still not elapsed, the proxy 19 will return the stored requested network analytics information to the NSSF 15 in step S406.

However, at a later instance, the NSSF 15 sends a further request to the proxy 19 in step S408 comprising the Analytic ID, the Slice instance ID and the User/User group ID.

At this point in time, the expiry time has elapsed, and the proxy 19 and the NWDAF 13 will have to repeat steps S401c-S403b on behalf of the NSSF 15 such that the proxy 19 finally can send the requested network analytics information, and any expiry time associated with it, to the NSSF 14 in step S409.

Figure 8:
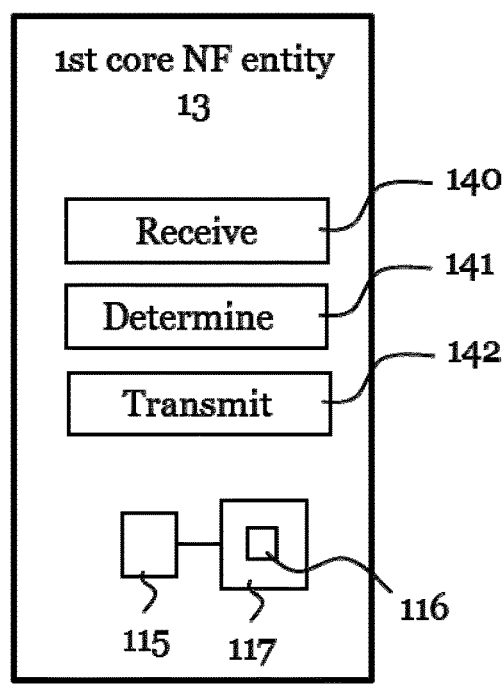
FIG. 8 illustrates a first core NF entity according to an embodiment.

Advantageously, the proxy 19 will act as a cache for storing requested network analytics information. In this way, since the NFs make requests to the proxy 19 while the proxy 19 handles the expiry time, the service consumer implementations are not impacted and the signalling optimization in the NWDAF is maintained. Unsuccessful FIG. 8 illustrates a first core NF entity 13 according to an embodiment. The steps of the method performed by the first core NF entity 13 of providing requested network information to a second NF entity according to embodiments are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the first core NF entity 13 to carry out the method according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD) etc.

The first core NF entity 13 comprises receiving means 140 adapted to receive a request to obtain the network information originating from the second NF entity, determining means 141 adapted to determining an expiry time stipulating how long the requested network information is valid, and transmitting means 142 adapted to transmit, towards the second NF entity, the requested network information and the expiry time.

The means 140-142 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 9:
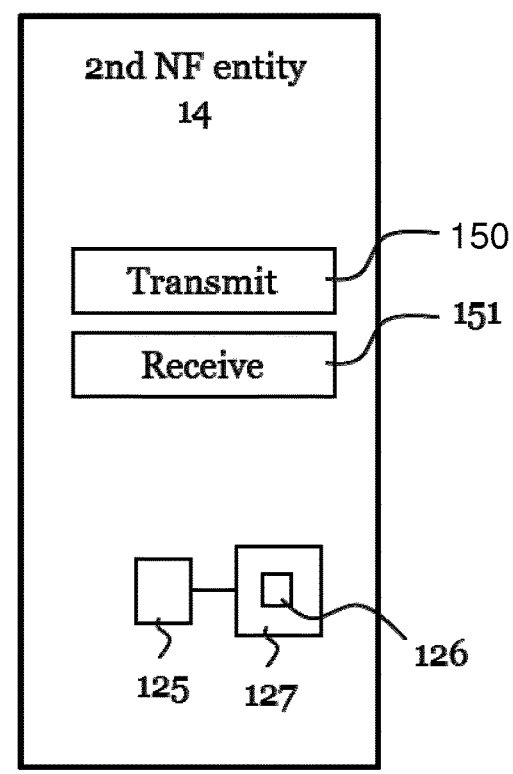
FIG. 9 illustrates a second NF entity according to an embodiment.

FIG. 9 illustrates a second NF entity 14 according to an embodiment. The steps of the method performed by the second NF entity of obtaining network information of a first core NF entity according to embodiments are in practice performed by a processing unit 125 embodied in the form of one or more microprocessors arranged to execute a computer program 126 downloaded to a suitable storage volatile medium 127 associated with the microprocessor, such as a RAM, or a non-volatile storage medium such as a Flash memory or a hard disk drive. The processing unit 125 is arranged to cause the second NF entity 14 to carry out the method according to embodiments when the appropriate computer program 126 comprising computer-executable instructions is downloaded to the storage medium 127 and executed by the processing unit 125. The storage medium 127 may also be a computer program product comprising the computer program 126. Alternatively, the computer program 126 may be transferred to the storage medium 127 by means of a suitable computer program product, such as a DVD or a memory stick. As a further alternative, the computer program 126 may be downloaded to the storage medium 127 over a network. The processing unit 125 may alternatively be embodied in the form of a DSP, an ASIC, a FPGA, a CPLD, etc.

The second NF entity 14 comprises transmitting means 150 adapted to transmit, towards the first core NF entity, a request to obtain the network information, and receiving means 151 adapted to receive the requested network information and an expiry time determined by the first core NF entity stipulating how long the requested network information is valid.

The means 150 and 151 may comprise communications interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 10:
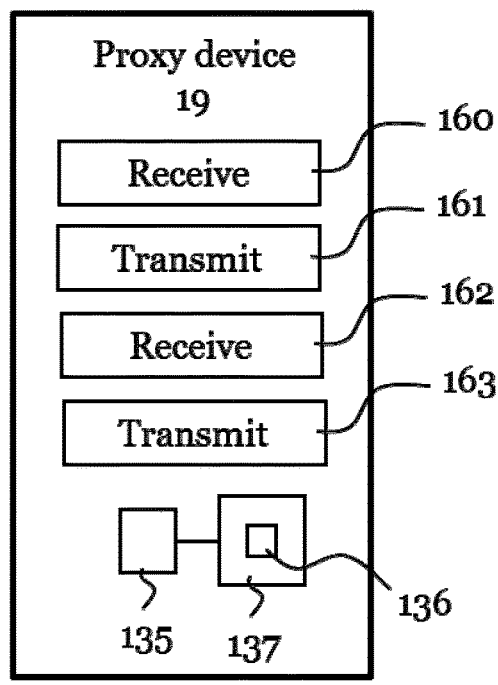
FIG. 10 illustrates a proxy device according to another embodiment.

FIG. 10 illustrates a proxy device 19 according to an embodiment. The steps of the method performed by the proxy device 19 of providing requested network information of a first core NF entity to a second NF entity according to embodiments are in practice performed by a processing unit 135 embodied in the form of one or more microprocessors arranged to execute a computer program 136 downloaded to a suitable storage volatile medium 137 associated with the microprocessor, such as a RAM, or a non-volatile storage medium such as a Flash memory or a hard disk drive. The processing unit 135 is arranged to cause the proxy device 19 to carry out the method according to embodiments when the appropriate computer program 136 comprising computer-executable instructions is downloaded to the storage medium 137 and executed by the processing unit 135. The storage medium 137 may also be a computer program product comprising the computer program 136. Alternatively, the computer program 116 may be transferred to the storage medium 137 by means of a suitable computer program product, such as a Digital Versatile Disc (DVD) or a memory stick. As a further alternative, the computer program 136 may be downloaded to the storage medium 137 over a network. The processing unit 135 may alternatively be embodied in the form of a digital signal processor (DSP), an application specific integrated circuit (ASIC), a field-programmable gate array (FPGA), a complex programmable logic device (CPLD), etc.

The proxy device 19 comprises receiving means 160 adapted to receive, from the second NF entity, a request to obtain the network information, transmitting means 161 adapted to transmit, to the first core NF entity, the request to obtain the network information, receiving means 162 adapted to receive, from the first core NF entity, the requested network information and an expiry time determined by the first core NF entity stipulating how long the requested network information is valid, and transmitting means 163 adapted to transmit, to the second NF entity, the requested network information.

The means 160-163 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a first core network function, NF, entity of providing requested network information to a second NF entity, comprising:
   receiving a request to obtain the network information, which request originates from the second NF entity, and comprises an indication of periodicity with which the requested network information is to be obtained;
   determining an expiry time stipulating how long the requested network information is valid; and
   transmitting, towards the second NF entity, the requested network information and the expiry time.

2. The method of claim 1, the request further comprises at least one of: at least one identifier identifying a network slice instance for which the request is made, and at least one identifier identifying a user device or a group of user devices for which the request is made.

3. The method of claim 1, wherein the transmitting of the requested network information and the expiry time comprises:
   transmitting the requested network information with a periodicity stipulated by the determined expiry time.

4. The method of claim 3, further comprising:
   sending a message towards the second NF entity comprising a recommended periodicity stipulated by the determined expiry time; and
   receiving a confirmation originating from the second NF entity indicating whether the recommended periodicity stipulated by the determined expiry time should be used or not.

5. The method of claim 3, further comprising:
   sending an update message towards the second NF entity, in case it is determined that the expiry time for the requested network information has changed, the update message comprising a recommended periodicity stipulated by the determined changed expiry time; and
   receiving a confirmation originating from the second NF entity indicating whether the recommended periodicity stipulated by the determined changed expiry time should be used or not.

6. A method performed by a requesting Network Function, NF, entity of obtaining network information of a responding core NF entity, comprising:
   transmitting, towards the responding core NF entity, a request to obtain the network information, which request comprises an indication of periodicity with which the requested network information is to be obtained; and
   receiving the requested network information and an expiry time determined by the responding core NF entity stipulating how long the requested network information is valid.

7. The method of claim 6, wherein the requesting NF entity will refrain from making another request for said network information as long as the expiry time has not elapsed.

8. The method of claim 6, further comprising:
   storing the received network information and the expiry time.

9. The method of claim 6, the request further comprises at least one of: at least one identifier identifying a network slice instance for which the request is made, and at least one identifier identifying a user device or a group of user devices for which the request is made.

10. The method of claim 6, further comprising:
    receiving a message from the responding core NF entity comprising a recommended periodicity stipulated by the determined expiry time; and
    transmitting a confirmation to the responding core NF entity indicating whether the recommended periodicity stipulated by the determined expiry time should be used or not.

11. The method of claim 10, further comprising:
    receiving an update message from the responding core NF entity, in case it is determined that the expiry time for the requested network information has changed, the update message comprising a recommended periodicity stipulated by the determined changed expiry time; and
    transmitting a confirmation to the responding core NF entity indicating whether the recommended periodicity stipulated by the determined changed expiry time should be used or not.

12. A first core network function, NF, entity for provision of requested network information to a second NF entity, the first core NF entity comprising:
one or more communication interfaces;
a memory, said memory containing computer-executable instructions; and
a processing unit configured to execute the computer-executable instructions to cause the first core NF entity to:
receive a request to obtain the network information, which request originates from the second NF entity and comprises an indication of periodicity with which the requested network information is to be obtained;
determine an expiry time stipulating how long the requested network information is valid; and to
transmit, towards the second NF entity, the requested network information and the expiry time.

13. The first core NF entity of claim 12, the request further being configured to comprise at least one of: at least one identifier identifying a network slice instance for which the request is made, and at least one identifier identifying a user device or a group of user devices for which the request is made.

14. The first core NF entity of claim 12, wherein the processing unit is further configured to execute the computer-executable instructions to cause the first core NF entity to, when transmitting the requested network information and the expiry time:
transmit the requested network information with a periodicity stipulated by the determined expiry time.

15. The first core NF entity of claim 14, wherein the processing unit is further configured to execute the computer-executable instructions to cause the first core NF entity to:
send a message towards the second NF entity comprising a recommended periodicity stipulated by the determined expiry time; and to
receive a confirmation originating from the second NF entity indicating whether the recommended periodicity stipulated by the determined expiry time should be used or not.

16. The first core NF entity of claim 14, wherein the processing unit is further configured to execute the computer-executable instructions to cause the first core NF entity to:
send an update message towards the second NF entity, in case it is determined that the expiry time for the requested network information has changed, the update message comprising a recommended periodicity stipulated by the determined changed expiry time; and to
receive a confirmation originating from the second NF entity indicating whether the recommended periodicity stipulated by the determined changed expiry time should be used or not.

17. A requesting Network Function, NF, entity for obtaining network information of a responding core NF entity, the requesting NF entity comprising:
one or more communication interfaces;
a memory, said memory containing computer-executable instructions; and
a processing unit configured to execute the computer-executable instructions to cause the requesting NF entity to:
transmit towards the responding core NF entity, a request to obtain the network information, which request comprises an indication of periodicity with which the requested network information is to be obtained; and to
receive the requested network information and an expiry time determined by the responding core NF entity stipulating how long the requested network information is valid.

18. The requesting NF entity of claim 17, wherein the requesting NF entity is configured to refrain from making another request for said network information as long as the expiry time has not elapsed.

19. The requesting NF entity of claim 17, further being operative to wherein the processing unit is further configured to execute the computer-executable instructions to cause the requesting NF entity to:
store the received network information and the expiry time.

20. The requesting NF entity of claim 17, the request further being configured to comprise at least one of: at least one identifier identifying a network slice instance for which the request is made, and at least one identifier identifying a user device or a group of user devices for which the request is made.

21. The requesting NF entity of claim 17, wherein the processing unit is further configured to execute the computer-executable instructions to cause the requesting NF entity to:
receive a message from the responding core NF entity comprising a recommended periodicity stipulated by the determined expiry time; and to
transmit a confirmation to the responding core NF entity indicating whether the recommended periodicity stipulated by the determined expiry time should be used or not.

22. The requesting NF entity of claim 21, wherein the processing unit is further configured to execute the computer-executable instructions to cause the requesting NF entity to:
receive an update message from the responding core NF entity, in case it is determined that the expiry time for the requested network information has changed, the update message comprising a recommended periodicity stipulated by the determined changed expiry time; and to
transmit a confirmation to the responding core NF entity indicating whether the recommended periodicity stipulated by the determined changed expiry time should be used or not.

* * * * *

UNITED STATES PATENT AND TRADEMARK OFFICE
CERTIFICATE OF CORRECTION

PATENT NO. : 11,290,897 B2
APPLICATION NO. : 17/055107
DATED : March 29, 2022
INVENTOR(S) : Örtenblad et al.

Page 1 of 1

It is certified that error appears in the above-identified patent and that said Letters Patent is hereby corrected as shown below:

In the Specification

In Column 4, Line 38, delete "eight" and insert -- eighth --, therefor.

In Column 6, Line 59, delete "101," and insert -- S101, --, therefor.

In the Claims

In Column 16, Lines 20-21, in Claim 19, delete "further being operative to wherein" and insert -- wherein --, therefor.

Signed and Sealed this
Thirtieth Day of August, 2022

Katherine Kelly Vidal
*Director of the United States Patent and Trademark Office*